Dec. 7, 1965 J. F. WOOD ETAL 3,222,461

MAGNETIC HEAD CONSTRUCTION

Filed April 24, 1962 2 Sheets-Sheet 1

INVENTORS
JOHN F. WOOD
JOHN FRISZ

BY J. B. Burke

ATTORNEY

Dec. 7, 1965 J. F. WOOD ETAL 3,222,461

MAGNETIC HEAD CONSTRUCTION

Filed April 24, 1962 2 Sheets-Sheet 2

*INVENTORS*
JOHN F. WOOD
JOHN FRISZ

*BY* J. B. Burke

*ATTORNEY*

United States Patent Office 3,222,461
Patented Dec. 7, 1965

3,222,461
MAGNETIC HEAD CONSTRUCTION

John F. Wood and John Frisz, both of San Juan, Puerto Rico, assignors to Euphonics Corporation, Rio Piedras, Puerto Rico, a corporation of Puerto Rico Filed Apr. 24, 1962, Ser. No. 189,753
8 Claims. (Cl. 179—100.2)

This invention concerns a novel magnetic scanning head and method of manufacture of the head.

In modern magnetic track scanning heads mechanical difficulties are encountered in manufacturing since dimensions must be controlled with extreme accuracy in the range of 150 to 250 micro-inches. When two or more heads are combined for multitrack use in stereophonic recording and reproducing, computer data storage and recovery and the like, mechanical difficulties encountered in maintaining closely precise dimensions are increased. Among the mechanical details which must be precisely determined are gap widths between pole pieces, parallel alignment of gaps when multiple heads are used, angular disposition of the gaps with respect to direction of travel of the magnetic tracks scanned by the heads, edge alignment of pairs of pole pieces, alignment of head assemblies with other adjacent erasing and recording heads, spacing of pole pieces and pole piece assemblies with respect to each other in a multitrack scanning head, etc.

The present invention has as a principal object minimizing the difficulties encountered in maintaining precise dimensions in mechanical details of a magnetic scanning head by a simplified construction.

A further object is to provide a novel, simplified, economical method of manufacturing a magnetic scanning head.

Still another object is to provide a novel magnetic pickup head wherein maximum use is made of economical, precisely stamped parts.

The invention will be best understood from the following description taken together with the drawing, wherein.

Figure 1:
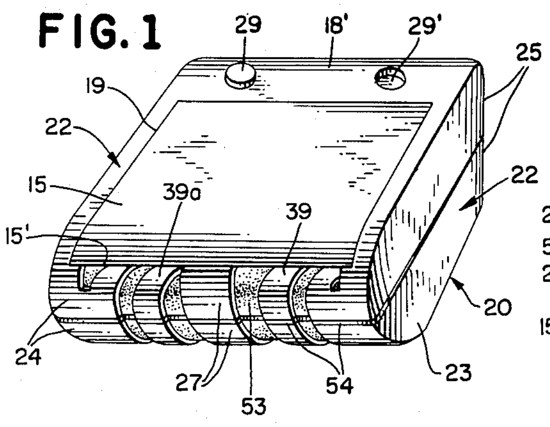
FIG. 1 is a perspective view of a stereophonic magnetic head embodying the invention.
Figure 2:
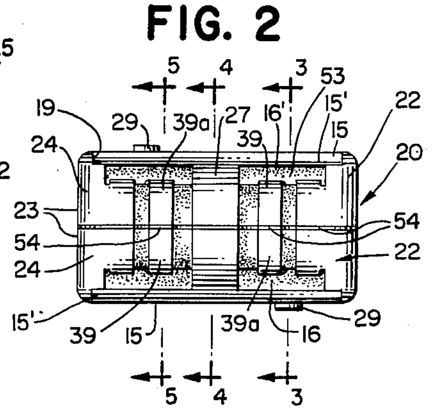
FIG. 2 is a front elevational view of the head.
Figure 3:
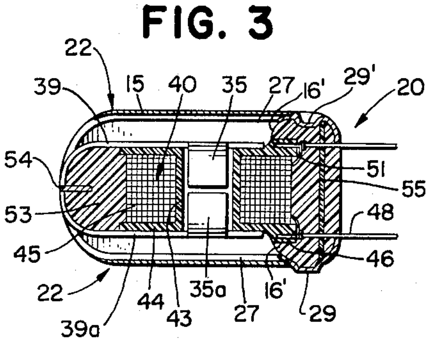
Figure 4:
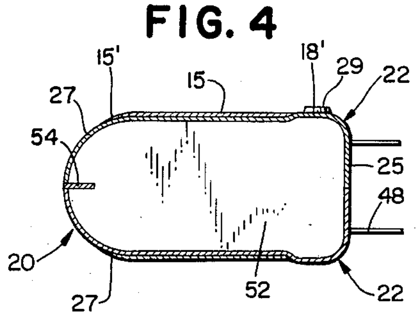
Figure 5:
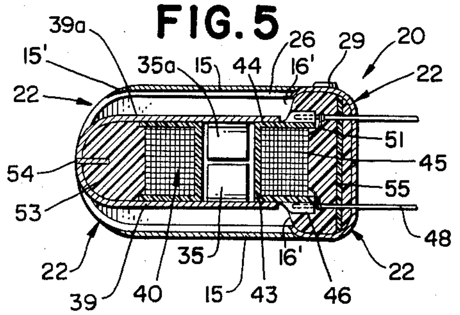

FIGS. 3, 4 and 5 are vertical sectional views taken on lines 3—3, 4—4 and 5—5 respectively of FIG. 2.

Figure 6:
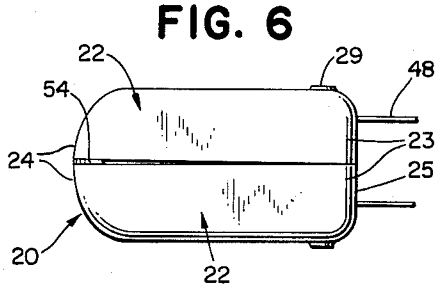

FIG. 6 is a side elevational view of the head.

Figure 7:
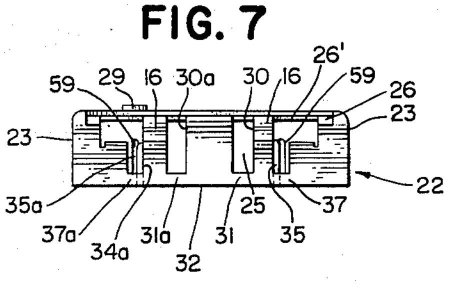

FIG. 7 is a front elevational view of a shell employed as part of the casing of the head.

Figure 8:
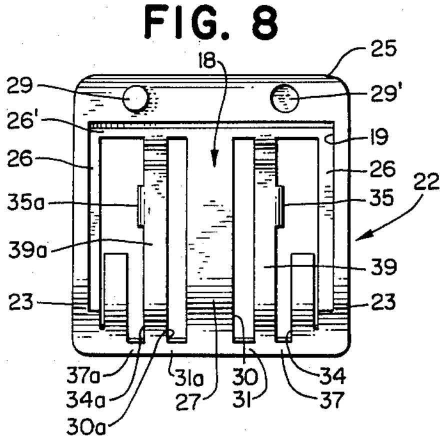

FIG. 8 is a top plan view of the shell of FIG. 7.

Figure 9:
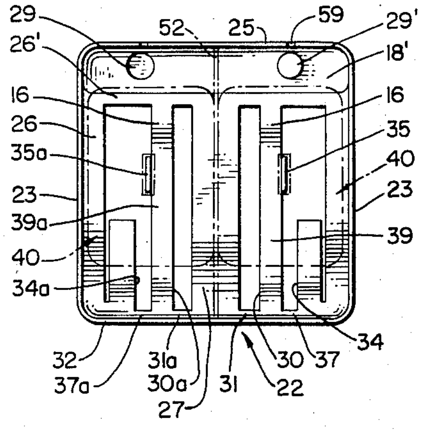

FIG. 9 is a bottom plan view of the shell of FIG. 7.

Figure 10:
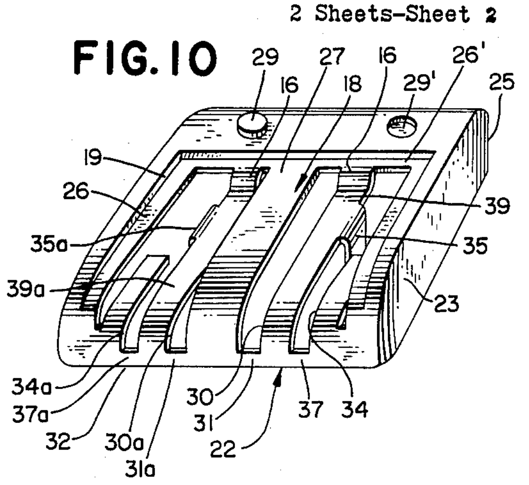

FIG. 10 is a perspective view of the shell of FIGS. 7–9.

Figure 11:
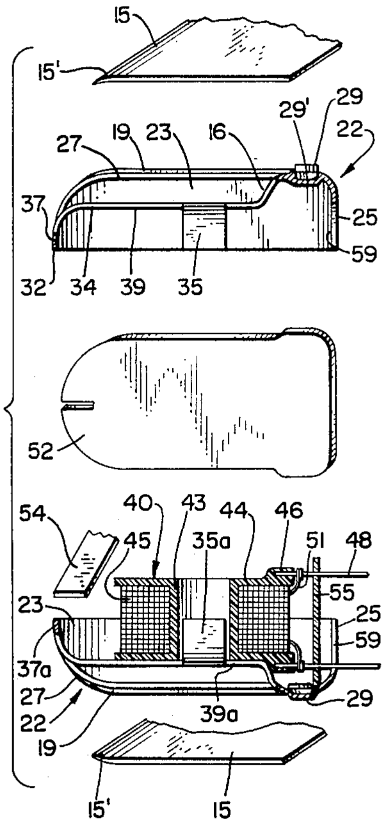

FIG. 11 is an exploded sectional view of parts of the head, certain other parts being shown in perspective.

Figure 12:
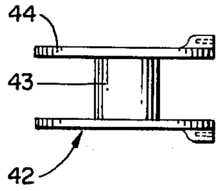

FIG. 12 is a side elevational view of a coil core employed in the head.

Figure 13:
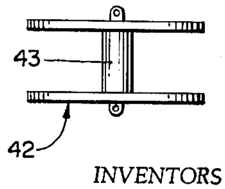

FIG. 13 is an end elevational view of the coil core.

Figure 14:
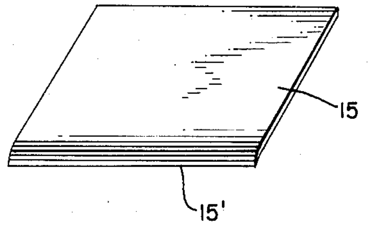

FIG. 14 is a perspective view of a shield insert employed in the head.

Referring to FIGS. 1–6, there is shown a magnetic head 20 having a casing formed by two shells 22. These shells are identical in structure and are formed by stamping and drawing a sheet of high magnetic permeability metal to the form shown to best advantage in FIGS. 7–11. These shells serve as both pole pieces and as magnetic shields of the head 20.

Each of the shells is generally rectangular in plan view with opposing sides 23, front end wall 24 and rear end wall 25. A rectangular recess 19 is formed for supporting a rectangular metal plate insert 15 by pressing or stamping a central wall portion 18 of the shell to define a rectangular U-shaped ledge 26. The ledge extends longitudinally at sides 23 and extends transversely across the shell at the bight 26′ of the ledge. A central strip 27 joins ledge portion 26′ to the front wall 24. The forward end wall 24 of the shell is slightly curved. On the outer side 18′ of the shell is a round projection 29 stamped outwardly and a round recess 29′ stamped inwardly, near opposite rear corners of the shell. A slot 30 is formed in the central wall portion 18 and front end wall 24. This slot terminates just short of the free edge 32 of the shell to define a web 31. Another slot 34 is formed parallel to slot 30 adjacent side wall 23 of the shell. Slot 34 terminates short of edge 32 to define web 37. The slot 34 has a widened rear end portion. At the inner edge of the slot 34 is a flat rectangular tab 35 which is bent inwardly of the shell to serve as a coil core member. Slots 30 and 34 are located in the right half of the shell as viewed in FIGS. 7–9. Similar slots **30*a* and 34*a* are formed in the left half of the shell. Slot 30*a* and slot 34*a* are mirror images of slots 30, 34. Rectangular tab 35*a* is formed on an inner edge of slot 34*a*. Webs 31*a* and 37*a* are located between edge 32 and the front ends of slots 30*a* and 34*a***.

Between slots 30 and 34 is a strip 39 and between slots **30*a* and 34*a* is another strip 39*a*. These strips are depressed below the level of ledge 26, 26′ and central strip 27. Strips 39 and 39*a* are integral at their front ends with the front wall 24. At their rear ends, the strips 39, 39*a* are joined to ledge portion 26′ by inclined webs 16. The plate 15 which fits into recess 19 is supported on ledge 26, 26′ and strip 27, and has a slightly curved front end 15′** as shown in FIGS. 1–5 and 14.

The shells 22 are described for a stereophonic, binaural or dual head assembly. This assembly employs two coil assemblies 40 which interfit with the coil core tabs 35, **35*a* as indicated by dotted lines in FIG. 9. The tabs 35, 35*a* project inwardly of each shell from the edges of strips 39, 39*a* at slots 34, 34*a*. Each coil assembly 40 includes a rectangular bobbin 42 having flat rectangular flanges 44 spaced by a rectangular tubular core support 43; see FIGS. 3, 9, 11–13. A coil of fine insulated wire is wound on each bobbin. Coil 45 is shown in FIGS. 3, 5 and 11. Tubular sockets 46 are formed on outer sides of the flanges 44. These sockets receive terminal pins 48 which are force fitted in the sockets and extend outwardly of the shells through slots 59 formed in their rear sides or walls 25. Leads 51 at ends of each coil are soldered or otherwise secured to the pins 48 at sockets 46. The interior of the shells is filled with a solid plastic resin potting material or compound 53 in which the coil assemblies 40 are embedded. The coil assemblies are separated by a partition 52 made of high permeability metal, clearly shown in FIGS. 4 and 11 and indicated by dotted lines in FIG. 9. A non-magnetic thin metal foil shim or strip 54 is inserted between facing front edges 32 of shells 22** and precisely fixes the spacing therebetween.

In constructing the head 20, two shells 22 are assembled as indicated in FIG. 11 with open sides facing each other. Two coil assemblies 40 are seated in the lower shell with their bobbins engaged on the tabs 35, **35*a* of the lower shell. Terminal pins 48 are disposed in a vertical plane and are held in precisely spaced disposition by an insulation plate 55. Partition 52 is disposed between the two coil assemblies. The foil strip 54 is inserted between the facing front edges 32 and overlays webs 31, 37, 31*a*, 37*a* of the lower shell. The lower pin 48 extends through slot 59 of the lower shell. The upper shell shown in FIG. 11 is then superimposed on the lower shell and coil assemblies, which may be supported in a suitable clamp, jig or fixture. The foil strip 54 is now located between facing edges 32 of the juxtaposed shells. After superposition of the upper shell on the lower shell, both shells are filled through the open slots 30, 30a, 34 or 34a with a viscous fluid plastic compound such as epoxy resin or the like. The shells are held pressed together by the clamp, jig or fixture which also closes the slots in the lower shell. The resin is set by application of heat to form a solid plastic body 53 in which the coil assemblies are embedded. Then the webs 31, 37 and 31a, 37a are cut away by milling cutters which penetrate into the plastic body. This leaves intact strips 39, 39a between slots 30, 34 and 30a, 34a. The strips serve as pole pieces for the head 20. Since these pole pieces are precisely located and oriented with respect to the mounting projections and recesses 29, 29'**, precise mounting of the head with respect to the tape to be scanned is assured.

The webs 16 at the rear ends of strips 39, 39a are also removed by suitable cutters. Removal of webs 16 prevents by-passing of magnetic flux around the low reluctance path defined by the rear ends of the shells. When the webs 16 are removed resin portions 16' are exposed. After all the webs are removed, the strips 39, 39a serve as pole pieces while the remainders of the shells serve as magnetic shields for the coil assemblies. If the resin body 53 is cut into when the webs are removed no adverse effects will be result.

Since slots 30, 34 and 30a, 34a are open, shield plates 15 are seated or inserted in recesses 19 and are secured on ledges 26, 26' and strips 27 by cement to complete the closure of the casing. The working surfaces of the head at the front ends of strips 39, 39a may be ground flat or to a desired curvature if desired and then polished. The projections and recesses 29, 29' may be interfitted with mating recesses and projections of another head 20 to provide an assembly of heads. Because of the unitary structure of head 20, the front faces of all pole pieces 39, 39a can be ground and polished simultaneously. This arrangement insures precise alignment of all front surface points of the head.

While the head 20 described and illustrated is intended for scanning two adjacent magnetic tracks of a magnetic medium such as a magnetic coated tape, it will be apparent the one of the coil assemblies 40 may be omitted if only one magnetic track is to be scanned. Alternatively if more than two tracks are to be scanned simultaneously, three, four or more coil assemblies 40 may be provided in the head which will be widened and proportioned to accommodate the requisite number of coil assemblies.

It will be noted that in head 20, the shells 22 of the casing and shield plates 15 may be made of inexpensive thin sheet metal stampings. The thin foil shim 54 can be cut from non-magnetic sheet material of uniform thickness to insure precisely dimensioned gaps between the facing edges of pole pieces 39, 39a.

FIGS. 1–6 show the head 20 after fabrication is completed. FIGS. 7–10 and 12–14 show parts of the head prior to assembly and FIG. 11 shows the head partially assembled and prior to cutting out of the webs.

If desired, suitable holes (not shown) can be tapped in the head casing for receiving mounting screws or suitable bosses with tapped holes may be provided for receiving mounting screws.

The head construction described can be manufactured with a minimum of parts at low cost and with a minimum of labor.

While a limited number of embodiments of the invention have been described, it will be apparent that various modifications are possible without departing from the invention as defined in the appended claims.

What is claimed and sought to be protected by Letters Patent of the United States is:

1. A scanning head for a magnetic track, comprising a casing having two opposing shells formed of material having high magnetic permeability, each of the shells having a front end wall, a rear end wall, opposing side walls, and a central wall disposed between the front, rear and side walls, each shell having a pair of spaced slots extending through the front end wall and central wall and defining a strip-like shell portion therebetween, a thin non-magnetic spacer member disposed between facing edges of the front end walls of the shells, a tab extending inwardly of each shell from each strip-like portion, rear ends of the strip-like shell portions being detached from the shells, and a coil assembly in the casing engaged on the tabs of the opposing shells, the strip-like portions of the opposing shells constituting cooperating magnetic pole pieces for the coil assembly.

2. A scanning head according to claim 1, wherein each shell has a recessed ledge formed around the central wall, said central wall being depressed inwardly of the shell in a plane spaced from the plane of said ledge, and plates formed of material having high magnetic permeability seated on the ledges and covering portions of the slots in the central walls, said plates being spaced from said strip-like portions, said strip-like portions having their rear ends located forwardly of said ledges and separate therefrom, and a mass of non-magnetic material in the casing holding the coil assembly and the strip-like portions in fixed positions with respect to each other and to the walls of the shells.

3. A scanning head for magnetic tracks, comprising a casing having two opposing shells formed of material having high magnetic permeability, each of the shells having a front end wall, a rear end wall, opposing side walls and a central wall disposed between the front, rear and side walls, each shell having a plurality of pairs of spaced slots extending through the front end wall and central wall, each pair of said slots defining a strip-like shell portion therebetween, each strip-like shell portion having a rear end detached from the shell, a thin non-magnetic spacer member disposed between facing edges of the front end walls of the shells, tabs extending inwardly of each shell from the respective strip-like portions thereof, and coil assemblies in the casing engaged on pairs of aligned tabs of the opposing shells, the strip-like portions of the shells constituting a plurality of pairs of cooperating magnetic pole pieces for the coil assemblies.

4. A scanning head according to claim 3, wherein each shell has a recessed ledge formed around the central wall, said central wall being depressed inwardly of the shell in a plane spaced from the plane of said ledge, said central wall having a central strip extending forwardly from the ledge in the plane thereof, the strip-like portions of each shell being located below the plane of the central wall and having rear ends located forwardly of a ledge and spaced therefrom, plates formed of material having high magnetic permeability seated on the ledges and central strips and spaced from the strip-like portions, said plates covering portions of the slots in the central walls, and a body of non-magnetic material in the casing holding the coil assemblies, strip-like portions, and spacer member in fixed positions with respect to each other and to the walls of the shells.

5. A scanning head according to claim 4, further comprising a partition made of material having high magnetic permeability located betwen adjacent coil assemblies in the casing to shield magnetically each coil assembly from the other inside the casing.

6. A magnetic track scanning head, comprising a casing having two opposing shells formed of material having high magnetic permeability, each of the shells having opposing side walls, opposing front and rear end walls and an outer wall joining the side and end walls of the shell, each of the shells having a recessed ledge formed just within the side and outer walls, and a depressed central wall extending forwardly from the ledge in a plane spaced from the plane of ledge, a pair of slots formed in said central wall and extending forwardly therein and through the front end of the shell, said slots defining a strip therebetween, said strip being detached from said ledge, said strip constituting a magnetic pole piece, a thin non-magnetic spacer disposed between facing edges of the strips to limit the spacing therebetween to a predetermined precise dimension, a coil and bobbin assembly disposed in the casing, a tab extending inwardly of each shell from one edge of the strip, the tabs of both shells being disposed in coplanar array, said bobbin receiving said tabs, a rigid plastic body fixing said assembly immovably in the casing, said assembly having terminal pins connected to ends of the coil and extending outside of the casing through the rear ends of the shells, and a rectangular plate of magnetic material seated on the ledge of each shell and spaced from said strips, said side, outer, and end walls of the shells together with the plates constituting a magnetic shield for said asembly.

7. A magnetic track scanning head, comprising a casing having two opposing shells formed of material having high magnetic permeability, each of the shells having opposing side walls, opposing front and rear end walls and an outer wall joining the side and end walls of the shell, each of the shells having a recessed ledge formed just within the side and outer walls, and a depressed central wall extending forwardly from the ledge in the plane of the ledge, a plurality of pairs of slots formed in said central wall and extending forwardly therein and through the front end wall of the shell, each pair of slots defining a strip therebetween, the strips being detached from the ledge in each shell and constituting magnetic pole pieces, thin spacer means disposed between facing edges of the strips to limit spacing therebetween to precise predetermined dimensions, said spacer means being non-magnetic, coil and bobbin assemblies disposed in the casing, tabs extending inwardly of each shell from edges of the strips, said bobbins being each engaged on a pair of aligned tabs of the two shells, a rigid plastic body fixing the assemblies inmmovably in the casing, said assemblies having terminal pins connected to ends of the coils and extending outside of the casing, and rectangular plates of magnetic material seated on the recessed ledges and covering the slots in the shells, the side, outer and end walls together with said plates constituting a magnetic shield for said assembly.

8. A magnetic track scanning head according to claim 7, further comprising another strip in each shell connected to and extending forwardly from the ledge in the plane thereof and terminating at the front end wall of the shell, said other strips abutting the plates seated on the ledges thereat, and a partition of magnetic material in the casing between the coil and bobbin assemblies forming part of said magnetic shield.

References Cited by the Examiner

UNITED STATES PATENTS

| | | | |
|---|---|---|---|
| 2,868,889 | 1/1959 | Patterson | 179—100.2 |
| 2,880,280 | 3/1959 | Gernert et al. | 179—100.2 |
| 2,920,149 | 1/1960 | Koren | 179—100.2 |
| 2,950,355 | 8/1960 | Moehring | 179—100.2 |
| 3,005,879 | 10/1961 | Moehring | 179—100.2 |
| 3,064,333 | 11/1962 | Kristiansen et al. | 29—155.56 |
| 3,069,755 | 12/1962 | Berkshire et al. | 29—155.58 |

BERNARD KONICK, *Primary Examiner.*